Jan. 18, 1949.  F. F. RANIVILLE  2,459,393
V-BELT TENSIONING CLAMP

Filed April 16, 1945  2 Sheets-Sheet 1

Inventor
Francis F. Raniville
By Liverance & Van Antwerp
Attorneys.

Jan. 18, 1949. F. F. RANIVILLE 2,459,393
V-BELT TENSIONING CLAMP
Filed April 16, 1945 2 Sheets-Sheet 2

Inventor
Francis F. Raniville
By Liverance & Van Antwerp
Attorneys

Patented Jan. 18, 1949

2,459,393

UNITED STATES PATENT OFFICE 2,459,393

V-BELT TENSIONING CLAMP

Francis F. Raniville, Grand Rapids, Mich., assignor to Ton-Tex Corporation, Grand Rapids, Mich., a corporation of Michigan Application April 16, 1945, Serial No. 588,557

3 Claims. (Cl. 254—52)

This invention relates to V-belt tensioning clamps, and is primarily designed to assist in coupling so called segment or laminated V-belts in various sizes and to properly tension the belts. It is an object and purpose of the present invention to provide a clamp which may be attached adjacent to the two ends of a length of belting, and by operation of the clamp and with the belt around pulleys of the character and diameter it is designed to work with, the belt at its ends is drawn together and tensioned by such drawing. While thus pulled and tensioned the ends of the belt are secured together, making an endless belt of the proper length and one which will engage the pulleys around which it is to be placed under a proper tension.

To properly tension V-belts of this character, the belts may be measured for the net length of the center distances and pulley diameters, allowing the ends of the belt to butt together but not overlap at the start. The belt is then placed around the pulleys and the clamp applied. In V-belts of well known character, consisting of a plurality of short segments of substantially equal length and in staggered relation to each other, partially overlapping, the segments being secured together by means of bolts or similar fastening devices passing through the overlapping portions thereof, the clamp is designed so that the initial tension and tilting of the bolts is taken out and compensated for, with an equivalent of taking up three segments of the belt; and under such circumstances the ends of the length of belting will overlap and securing bolts may be passed through holes in the segments thereof, the ends of the belt being connected and a complete and initially tensioned endless V-belting produced.

Of course it is to be understood that the tension on the belt should be exerted the full length of the belt and not merely on the length or run of belt to the end portions of which the clamp is applied at one side of the pulleys. This is accomplished either by a slight rotation of the pulleys or slipping of the belt around them as it is tensioned.

The present invention also has for a further object the production of a clamp for the purposes described which may be very simply and easily applied, it being only necessary to place the belt in the grooves or sheaves around which it is located, the grooves being designed to exactly fit the belt. A further object and purpose is to provide a V-belt tensioning clamp which may be readily operated to tension the belt to bring the holes of the overlapping segments at the ends of the belt in alignment and the clamp thereupon held securely in such position by a simple locking device for such purpose. Further it is an object and purpose of the clamp to provide one which is adjustable and having prescribed take-up, permitting the use of the clamp in connection with more than one size of belt, and for a re-application thereof to the belt after it has been run under circumstances comparative to that in which it will be actually used for a period of time, for example, 24 hours, it being advisable thereupon to retension the belt and take out from it the necessary segments, such retensioning correcting whatever permanent stretch may have occurred.

With these and other objects and purposes in view, I have made the invention described in the following description of a preferred embodiment of the invention, as shown in the accompanying drawings, in which.

Like reference characters refer to like parts in the different figures of the drawings.

Figure 3:
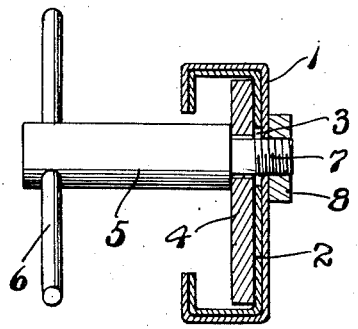
Fig. 3 is a vertical section on the plane of line 3—3 of Fig. 2.

In the construction of the clamp two channel shaped members 1 and 2 respectively are telescopically connected, the web of the inner channel 2 (Fig. 3) having a slot 3 therein. A plate 4 at the inner side of the channel 2 lies over the slot 3. A rod 5 provided at its outer end with a turning handle 6 at its inner end is reduced in diameter and threaded as indicated at 7. Said part 7 passes through an opening in the plate 4 and through the slot 3 and threads into a nut 8 at the outer side of the channel 1. Turning the rod 5 in one direction tightens the nut and clamps the parts securely together, the shoulder at the inner end of the rod 5 bearing against the plate 4 around the opening therethrough. A release of the nut is accomplished by turning the rod 5 in the opposite direction, whereupon members 1 and 2 are permitted a slidable movement with respect to each other.

Figures 5, 6:
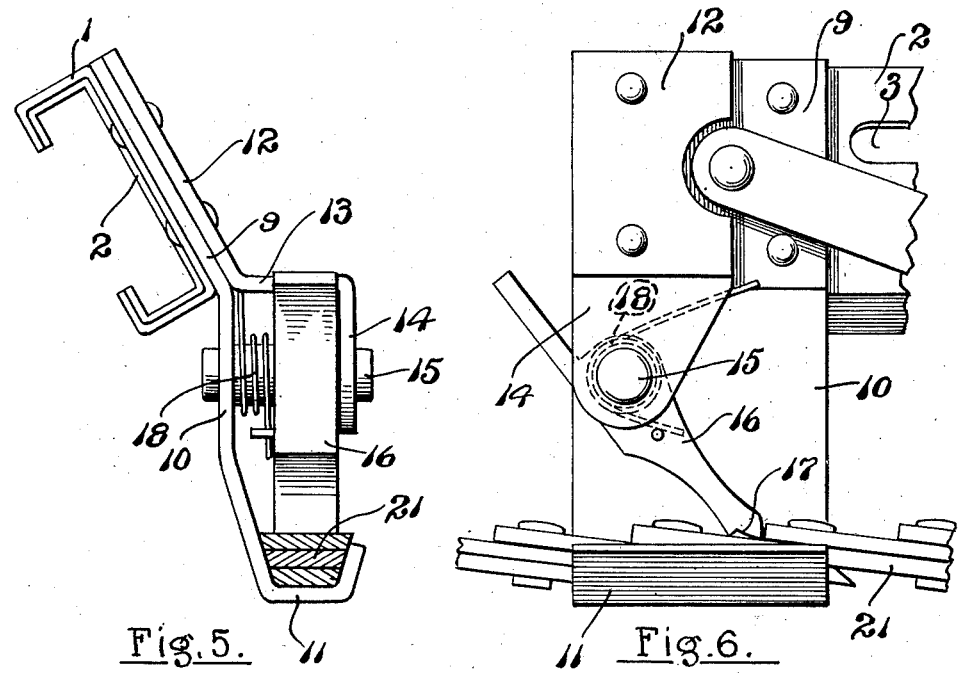
Fig. 5 is an end elevation of the clamp.
Fig. 6 is an enlarged fragmentary front elevation of the clamp showing the manner in which a holding dog engages with the belt which is being processed.

At the outer ends of the channel members 1 and 2 a plate of metal is permanently secured having a section 9 lying at the outer side of the respective webs of said channel members, and then bent at an angle to provide a section 10 and terminating below the section 10 in a belt receiving trough 11 as best shown in Fig. 5. A second plate 12, narrower in width than the plate 9, is located thereover at the outer end of each of the channel members 1 and 2, and is permanently secured with said plate 9 by rivets to the respective channels. It has a section 13 turned in a horizontal direction over the trough 11 and then turned downwardly in a terminal ear 14. A pivot pin 15 is mounted upon and extends through the ear 14 and section 10 spaced therefrom, on which pin a dog 16 is pivotally mounted, the lower end of which is shaped with an engaging foot as shown at 17 in Fig. 6. A coiled spring 18 around the pin has one arm engaging against the horizontal section 13 and the other against a pin extending from the dog 16, the normal tendency of which is to turn the dog (Fig. 6) in a clockwise direction so as to move the dog downwardly in the direction of the trough 11 or a belt therein immediately below.

Figure 1:
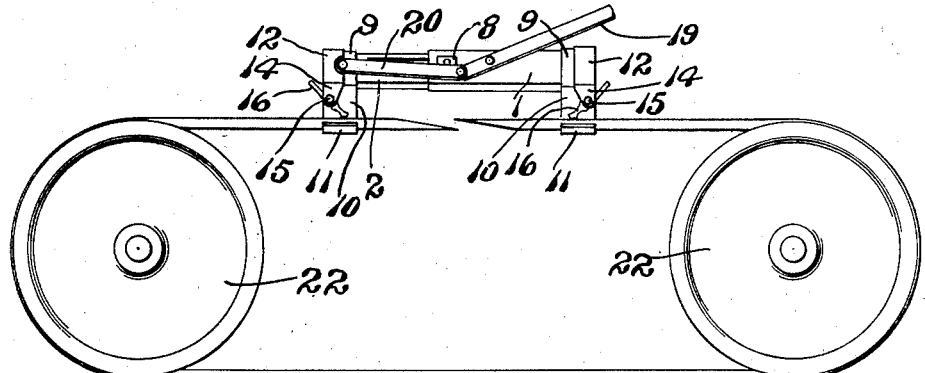
Fig. 1 is an elevation illustrating the manner in which the clamp of my invention is used.
Figure 2:
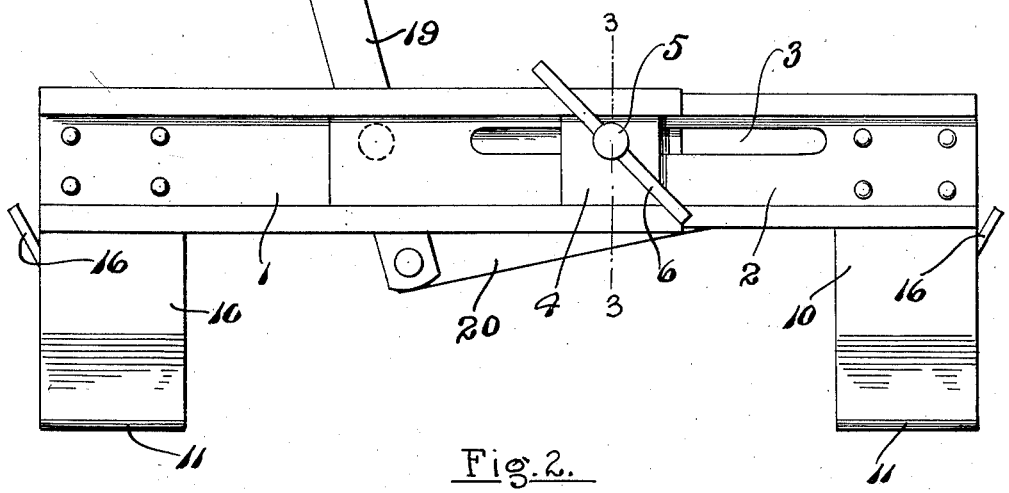
Fig. 2 is an enlarged elevation of the clamp shown in Fig. 1 from the opposite side thereof.
Figure 4:
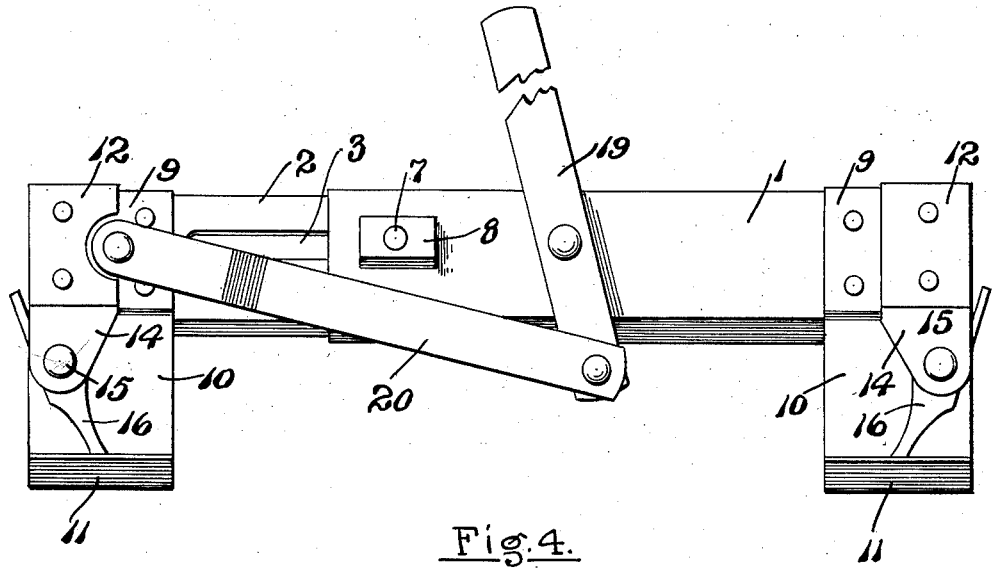
Fig. 4 is an elevation similar to Fig. 2 from the opposite side of the clamp.

An operating lever 19 is pivotally mounted between its ends (Figs. 1, 2 and 4) on the web of the channel member 1 and has a link 20 pivotally connected at one end to the lower end thereof, the other end extending to and having a pivotal connection with the channel bar 2 adjacent its outer end as best shown in Fig. 4. It is evident that by swinging the bar 19 from the position shown in Fig. 4 to that shown in Fig. 1 the clamp may be extended and then by swinging back toward the initial position the clamp may be retracted in length.

The clamp described is designed to be used primarily with laminated sectional belts of the V-type or character, as shown at 21 in Fig. 6. The belt of a measured net length so as to pass around two grooved pulleys or sheaves 22 and with its ends separated, as in Fig. 1, has the clamp connected to the separated end portions of the belt with the channel bars 1 and 2 extended as in Fig. 1. It is apparent that the dogs 16 will engage the upper sides of the opposite end portions of the belt and as said dogs extend downwardly and inwardly toward each other, will grip the belt and force the end portions thereof downwardly into the troughs 11 which are shaped to receive the belt, the lower ends of the dogs 16 engaging one behind a lamination of the belt as shown in Fig. 6 and the other engaging against the head of a bolt, a plurality of which are used in connecting the sectional laminations of the belt together. Then by moving the lever 19 from the position shown in Fig. 1 to or toward that shown in Fig. 4, the belt is tensioned and the overlapping end laminations at the ends of the belt brought together with holes for passage of the connecting bolts in superimposed laminations in alignment. When this stage of the operation is reached, the handle 6 is turned to tighten the nut 8 and clamp the telescoping channel bar members 1 and 2 securely together, holding the belt in position with the bolt receiving holes in alignment. Bolts may then be passed through said holes and the belt completed as an endless V-belt under a desired and predetermined initial tension. The clamp is then released, the upper ends of the dogs 16 being engageable for such purpose.

It will be noted that, as shown in Fig. 5, the troughs 11 and dogs 16 are positioned in substantially a vertical plane and that the telescoping channel bars 1 and 2 are inclined at an angle to the vertical and are therefore set off to one side from the belt, rendering it accessible for connecting the end of the belt sections or laminations together by passing the securing bolts through the aligned holes described. After the belt under initial tension has been run for a period of time, as for example 24 hours, the clamp may be then applied and a further pull and tension exerted thereon by said clamp with a removal of a predetermined number of sections from the belt sufficient to take up the slack which has developed through said initial running and to compensate for the lengthening of the belt because of any tilting of the connecting bolts.

It is understood that while the V-belt tensioning clamp has been designed primarily for the proper initial and subsequent tensionings of the belt, it should not be and is not limited necessarily in use to one type of belt, but is available for use in tensioning various other characters of belts and connecting overlapping ends thereof when and after the tension has been applied. The foot construction at 17 of the dog 16 causes a gouging thereof into the upper sides of the belt material and insures against slippage of the dogs over the surfaces of the belt against which engaged. The invention is adaptable to any use it can be put and not necessarily limited to the one use in connection with V-belts. The clamp is very practical and useful and has proven of great utility.

The invention is defined in the appended claims and is to be considered comprehensive of all forms of structure coming within their scope.

I claim:

1. A belt clamp comprising, two telescoping members of channel form, a plate secured at the outer end of each channel member and depending therebelow and formed at its lower end portion into a belt receiving trough open at its upper side, a second plate located over the first plate and permanently secured therewith to its respective channel member and having an outturned intermediate section and terminating in a downturned section, a pivot pin extending through the downturned section and an opposite portion of the first plate, a spring actuated dog mounted on said pivot pin over said channel, manually operated means mounted on one of said channels and connected with the other channel for adjusting said channel members longitudinally with respect to each other, and means for releasably securing said channel members in any position to which adjusted.

2. A construction containing the elements defined in claim 1, said channel members being located generally in a plane inclined to the vertical and the first mentioned plates secured thereto having a section similarly inclined to connect with its respective channel, the lower section below said first mentioned section lying in a vertical plane and a pivot pin on which said dog is mounted lying in a substantially horizontal plane.

3. A belt clamp comprising two channel members one telescoping within the other and having their webs in a plane inclined to the vertical, belt clamping means attached to the webs of said channels at the outer ends thereof, including plates with upper sections located in a plane inclined to the vertical to lie against said webs, said plates below the channel having a downwardly extending section located substantially in a vertical plane and terminating in a trough open at its upper side, dogs pivotally mounted to turn about horizontal axes on said plates located over said troughs, said dogs extending downwardly and inwardly at their ends toward each other, spring means acting on said dogs to turn them in a direction to bring the lower ends of said dogs into said troughs whereby they will automatically engage with the upper sides of the end portions of a belt received in said troughs, and manually operable means for moving said telescoping channels longitudinally with respect to each other.

FRANCIS F. RANIVILLE.

REFERENCES CITED

The following references are of record in the file of this patent:

UNITED STATES PATENTS

| Number | Name | Date |
| --- | --- | --- |
| 149,423 | Work | Apr. 7, 1874 |
| 198,654 | Meeker | Dec. 25, 1877 |
| 244,034 | Corbit | July 12, 1881 |
| 323,947 | McMickin | Aug. 11, 1885 |
| 1,237,875 | Dickerson | Aug. 21, 1917 |
| 1,413,768 | O'Connor | Apr. 25, 1922 |
| 1,503,237 | Guenther | July 29, 1924 |
| 1,834,232 | Wolf | Dec. 1, 1931 |